United States Patent
Chen (10) Patent No.: US 11,614,914 B2
(45) Date of Patent: Mar. 28, 2023

(54) AUDIO DATA PROCESSING CIRCUIT AND PROCESSING METHOD THEREOF

(71) Applicant: SILICON INTEGRATED SYSTEMS CORP., Hsinchu (TW)

(72) Inventor: Han-Ning Chen, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 55 days.

(21) Appl. No.: 17/107,220

(22) Filed: Nov. 30, 2020

(65) Prior Publication Data

US 2021/0173611 A1    Jun. 10, 2021

(30) Foreign Application Priority Data

Dec. 5, 2019   (TW) .................................. 108144519

(51) Int. Cl.
*G06F 3/16*   (2006.01)
*G06F 1/04*   (2006.01)

(52) U.S. Cl.
CPC ................ *G06F 3/162* (2013.01); *G06F 1/04* (2013.01)

(58) Field of Classification Search
CPC .................................. G06F 3/162; G06F 1/04
See application file for complete search history.

(56) References Cited

U.S. PATENT DOCUMENTS

| | | | |
|---|---|---|---|
| 7,376,778 B2 | 5/2008 | Sinai | |
| 8,811,468 B2 | 8/2014 | Ibrahim et al. | |
| 9,661,415 B2 | 5/2017 | Yeh et al. | |
| 10,339,087 B2 | 7/2019 | Simmons | |
| 10,504,526 B2 | 12/2019 | Sinai | |
| 10,872,049 B2 | 12/2020 | Kessler et al. | |
| 10,997,104 B2 | 5/2021 | Rand et al. | |
| 2003/0108105 A1 | 6/2003 | Morad et al. | |
| 2013/0182850 A1* | 7/2013 | Kruiskamp | H04H 20/47 381/1 |
| 2013/0322439 A1 | 12/2013 | Verhallen et al. | |
| 2014/0341230 A1* | 11/2014 | Felder | H04J 3/1694 370/438 |
| 2014/0341398 A1* | 11/2014 | Felder | H04J 3/1694 381/120 |
| 2015/0378960 A1 | 12/2015 | Huffman | |
| 2017/0221490 A1 | 8/2017 | Sinai | |

(Continued)

FOREIGN PATENT DOCUMENTS

| CN | 101599053 A | 12/2009 |
|---|---|---|
| CN | 202978893 U | 6/2013 |
| CN | 104011697 A | 8/2014 |

(Continued)

*Primary Examiner* — Joseph Saunders, Jr.
*Assistant Examiner* — Joseph Saunders (57) ABSTRACT

The present disclosure provides an audio data processing circuit and an audio data processing method. The audio data processing circuit includes a word select interface, a clock signal interface and an audio data interface. The word select interface is configured to receive a word select signal. The clock signal interface is configured to receive a clock signal, and generating an audio data interface signal according to a number of clocks of the clock signal in one period of the word select signal. The audio data interface is configured to transmit the audio data to a processing unit through a first transmission protocol or a second transmission protocol.

8 Claims, 8 Drawing Sheets

(56) References Cited

U.S. PATENT DOCUMENTS

2020/0106224 A1* 4/2020 Felder .................... H04Q 11/00

FOREIGN PATENT DOCUMENTS

| | | |
|---|---|---|
| CN | 205029822 U | 2/2016 |
| CN | 105635907 A | 6/2016 |
| CN | 107025200 A | 8/2017 |
| CN | 110235115 A | 9/2019 |
| TW | 200721704 A | 6/2007 |
| TW | 201407601 A | 2/2014 |
| TW | I434523 B | 4/2014 |
| TW | 201417594 A | 5/2014 |

* cited by examiner

AUDIO DATA PROCESSING CIRCUIT AND PROCESSING METHOD THEREOF

FIELD OF INVENTION

The present disclosure relates to an audio data processing circuit and an audio data processing method, in particular to an audio data processing circuit and an audio data processing method that can quickly detect an audio transmission interface

BACKGROUND OF INVENTION

There are a variety of audio transmission interfaces for digital microphones (DMIC, Digital Microphone) on the current market. Commonly audio transmission interfaces include inter-chip audio transmission (I2S, Inter-IC Sound), time division multiplexing, and other DMIC audio transmission interfaces.

Figure 1:
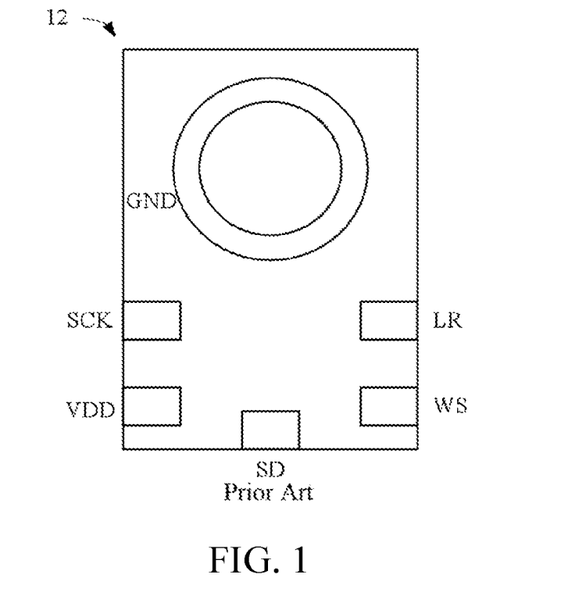
FIG. 1 shows a schematic diagram of an I2S audio chip pins.

Referring to FIG. 1, FIG. 1 shows a schematic diagram of a I2S audio chip pins. The I2S audio chip 12 includes a serial clock (SCK) pin, a word select (WS) pin, a left right (LR) pin, a serial data (SD) pin, a high electrical potential VDD pin, and a low electrical potential GND pin. The I2S audio transmission protocol uses two chips to divide the audio data into two sets of left and right channels and transmitted in sequence, and then the SCK pin connected to the bit clock line receives the clock signal, then the WS pin receives the signal to distinguish whether the audio channel is the left channel or the right channel, and the LR pin is configured to select whether the chip is processing the audio data of the left channel or the right channel, wherein grounding the LR pin to GND is the left channel, and connecting the LR pin to the high potential VDD pin is the right channel. Since the WS pin can distinguish whether the chip is transmitting the sequence of the left channel or the right channel, the audio data can be directly transmitted to the processing unit through the chip of SD pin, without an additional audio decoder to interpret the transmitted data.

Figure 2:
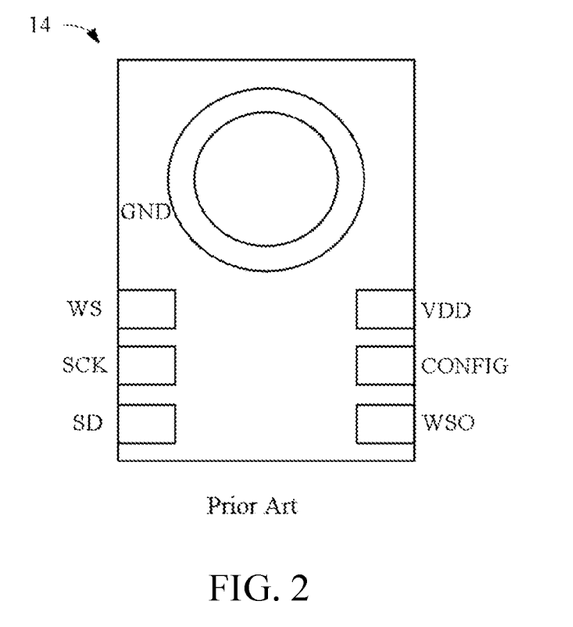
FIG. 2 shows a schematic diagram of the TDM audio chip pins.

Please refer to FIG. 2. FIG. 2 shows a schematic diagram of the TDM audio chip pins. TDM audio chip 14 includes a serial clock (SCK) pin, a word select (WS) pin, a configure (CONFIG) pin, a serial data pin, a high electrical potential VDD pin, and a low electrical potential GND pin. The TDM audio transmission protocol also requires the SCK, WS, LR and SD pins. In addition, since the TDM chip can be connected in series to increase the number of channels, therefore required an additional WSO pin to transmit the WS signal of the current-level chip by the WSO pin to the WS pin of the next-level chip, the TDM chip can connect up to 16 chips in series by daisy chain topology, which means that the TDM audio transmission protocol can simultaneously transmit the audio data by up to 16 channels.

The I2S transmission protocol has the advantage of not requiring an audio decoder, but it can only transmit two-channel audio data at the same time. The TDM transmission protocol can connect 1 to 16 chips in series as required, but requires more pins. Therefore, when various transmission protocols have their own advantages and disadvantages, digital microphones usually have interfaces that can transmit these two protocols at the same time. Therefore, the audio processing module of the digital microphone needs to determine which transmission protocol is used for the received audio data, then determine the bit depth of the audio data and the number of channels of the I2S transmission protocol to process the audio data. However, it takes too much time to determine the bit depth and the number of channels, resulting in too slow audio processing speeds.

Therefore, it is necessary to provide an audio data processing circuit and an audio data processing method that can quickly detect the transmitted audio data protocol interface to accelerate the processing speed of the audio data.

SUMMARY OF INVENTION

The present disclosure provides an audio data processing circuit configured to process audio data. The audio data processing circuit includes a word select interface, a clock signal interface and an audio data interface. The word select interface is configured to receive a word select signal. The clock signal interface is configured to receive a clock signal, and generating an audio data interface signal according to a number of clocks of the clock signal in one period of the word select signal. The audio data interface is configured to transmit the audio data to a processing unit through a first transmission protocol or a second transmission protocol.

Preferably, the audio data processing circuit includes a counter, a first logic unit, and a second logic unit. The counter is configured to count the number of clocks of the clock signal. The first logic unit is configured to generate the audio data interface signal according to the word select signal and a channel selection signal. The second logic unit is configured to calculate the number of clocks of the clock signal in one period of the word select signal.

Preferably, a bit depth of the audio data is 32 bits.

Preferably, the first transmission protocol is an inter-IC sound protocol, and the second transmission protocol is a time division multiplexing protocol.

Preferably, when the number of clocks of the clock signal in one period of the word select signal is more than 64, the audio data is transmitted to the processing unit through the second transmission protocol.

The present disclosure also provides an audio data processing method including steps one to four. step 1: detecting a word select signal in an audio data; step 2: determining whether a number of clocks of the clock signal in one period of the word select signal is 64 and going to step 3 if the number of clocks of the clock signal in one period of the word select signal is 64, else going to step 4; step 3: sending the audio data to the processing unit through a first transmission protocol; and step 4: sending the audio data to the processing unit through a second transmission protocol.

Preferably, a bit depth of the audio data is 32 bits.

Preferably, the step 2 further includes calculating the number of clocks of a clock signal in one period of the word select signal by a counter of the processing unit, and determining whether the number of clocks of the clock signal in one period of the word select signal is 64.

Preferably, the step 2 further includes: generating an audio data interface signal according to a channel selection signal and the word select signal by a first logic unit of the processing unit and transmitting the audio data to the processing unit through the first transmission protocol or the second transmission protocol according to the audio data interface signal.

Preferably, the step 2 includes determining a number of channels of the audio data according to the period of the word select signal by a second logic unit of the processing unit.

With the audio data processing circuit and audio processing method of the present disclosure, a simple circuit can be configured to process audio data received by two transmission protocols of I2S and TDM, and to quickly determine the transmission protocol interface and channel number of the audio data, to transmit the audio data to the corresponding audio chip to process the audio data.

DETAILED DESCRIPTION OF PREFERRED EMBODIMENTS

In order to make the above and other objectives, features, and advantages of the present disclosure more obvious and understandable, the following will specifically enumerate the preferred embodiments of the present disclosure, together with the accompanying figures, and describe in detail as follows. Furthermore, the directional terms mentioned in the present disclosure, such as up, down, top, bottom, front, back, left, right, inside, outside, side, surrounding, center, horizontal, horizontal, vertical, vertical, axial, the radial direction, the uppermost layer or the lowermost layer, etc., are only the direction of reference to the attached figures. Therefore, the directional terms are used to describe and understand the present disclosure, rather than to limit the present disclosure.

Figure 3:
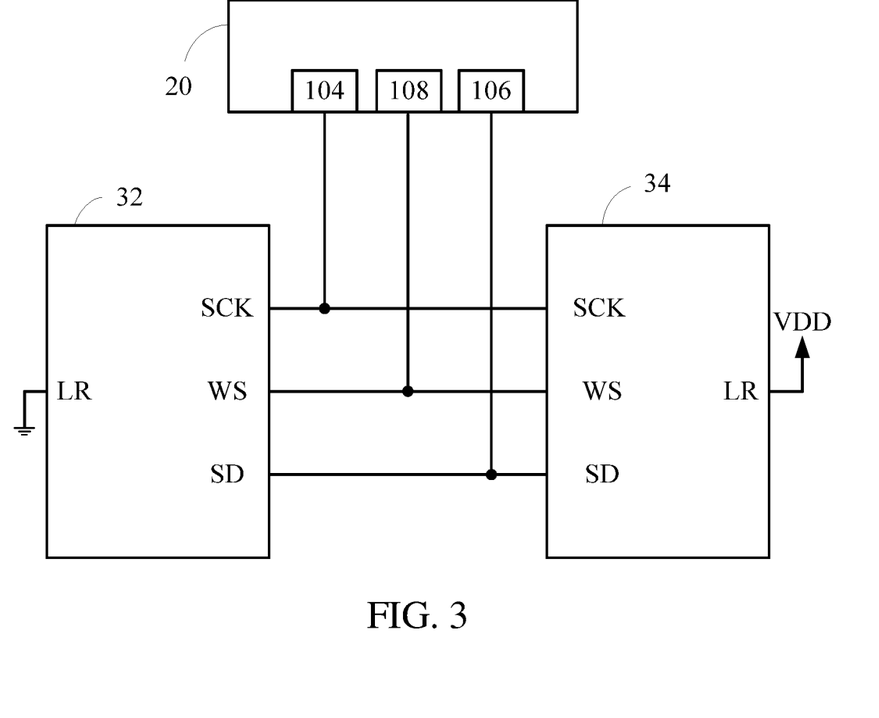
FIG. 3 shows a schematic diagram of a I2S transmission circuit.

Please refer to the schematic diagram of the I2S transmission circuit in FIG. 3. As shown in FIG. 3, the I2S transmission circuit includes a processing unit 20 and two I2S audio chips 32, 34, and the processing unit 20 includes a clock signal interface 104, an audio data interface 106, and a word select interface 108. The clock signal interface 104 transmits the clock signal to the I2S audio chips 32 and 34. In one embodiment of the present disclosure, the LR pin of the I2S audio chip 32 is connected to a low electrical potential, and the LR pin of the I2S audio chip 34 is connected to a high electrical potential. Therefore, the I2S audio chips 32 and 34 process audio data of the left channel and right channel, respectively.

Figure 4:
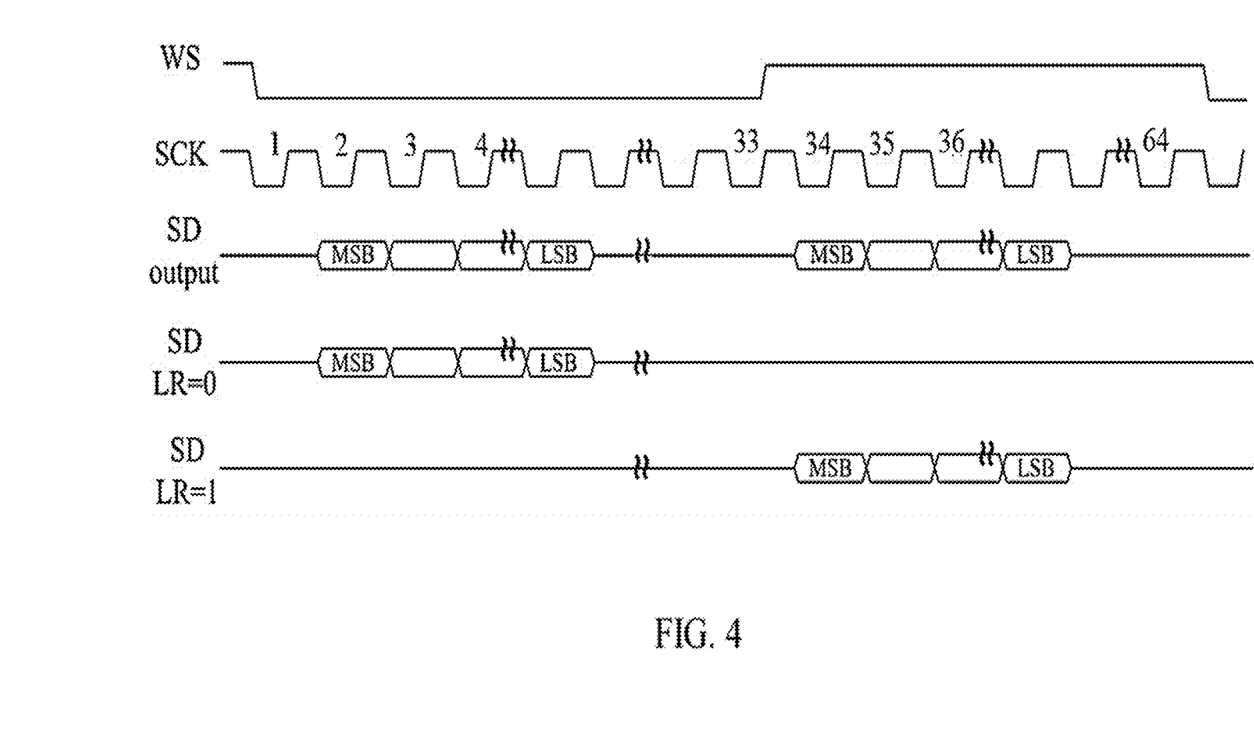
FIG. 4 shows a signal time sequence diagram of the I2S transmission circuit shown in FIG. 3
Figure 5:
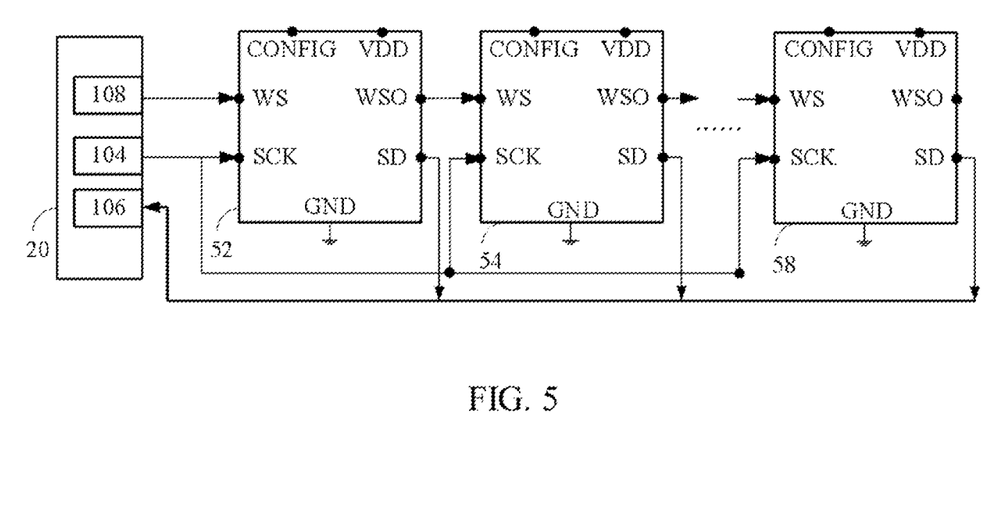
FIG. 5 shows a schematic diagram of a TDM transmission circuit.

Please also refer to FIG. 4, which shows a signal time sequence diagram of the I2S transmission circuit shown in FIG. 3. The I2S transmission circuit includes two I2S audio chips 32, 34 and the processing unit 20. The clock signal interface 104 and the word select interface 108 of the processing unit 20 respectively transmit the clock signal SCK and the word select signal WS to the I2S audio chips 32 and 34, respectively. The I2S audio chips 32 and 34 output time sequence data SD of (LR=0) and time sequence data SD (LR=1), wherein the start and end of time series data are the most significant bit (MSB) and the least significant bit (LSB), respectively. The word select signal WS determines the audio data of the left channel or the right channel. As shown in FIG. 5, the word select signal WS is at a low electrical potential during the first 32 clock periods, at this time, the LR pin is connected to the low level I2S audio chip 32 to output effective bits. The word select signal WS is at high electrical potential during the next 32 clock periods, at this time, the I2S audio chip 34 connected to the high electrical potential at the LR pin outputs effective bits. Therefore, the audio data interface 106 of the processing unit 20 receives the audio data of the left channel during the first 32 clock periods, and receives the audio data of the right channel during the 33-64th clock periods.

FIG. 5 shows a schematic diagram of a TDM transmission circuit. The TDM transmission circuit has a processing unit 20 and TDM audio chips 52, 54 and 58. In one embodiment, the TDM transmission circuit includes 3 TDM audio chips, it is worth noting that the TDM can transmit the word select signal WS to the WS pin of the next level by the WSO pin of current level, so the TDM transmission circuit can adjust the number of TDM audio chips based on the demand of audio channels. In the TDM transmission circuit, the processing unit 20 also has a clock signal interface 104, an audio data interface 106, and a word select interface 108. The clock signal interface 104 of the processing unit 20 transmits clock signals to the TDM audio chips 52, 54, 58. The processing unit 20 transmits the word select signal WS to the WS pin of the TDM audio chip 52, and the TDM audio chip 52 transmits the word select signal WS to the WS pin of the next-level TDM audio chip 54 through the WSO pin. The TDM audio chip 54 then transmits the word select signal WS to the WS pin of the TDM audio chip 58 of the next stage by the WSO pin. When the TDM transmission circuit includes more than three TDM audio chips, the WS pin of the TDM audio chip receives the word select signal WS transmitted by the WSO pin of the upper level.

Figure 6:
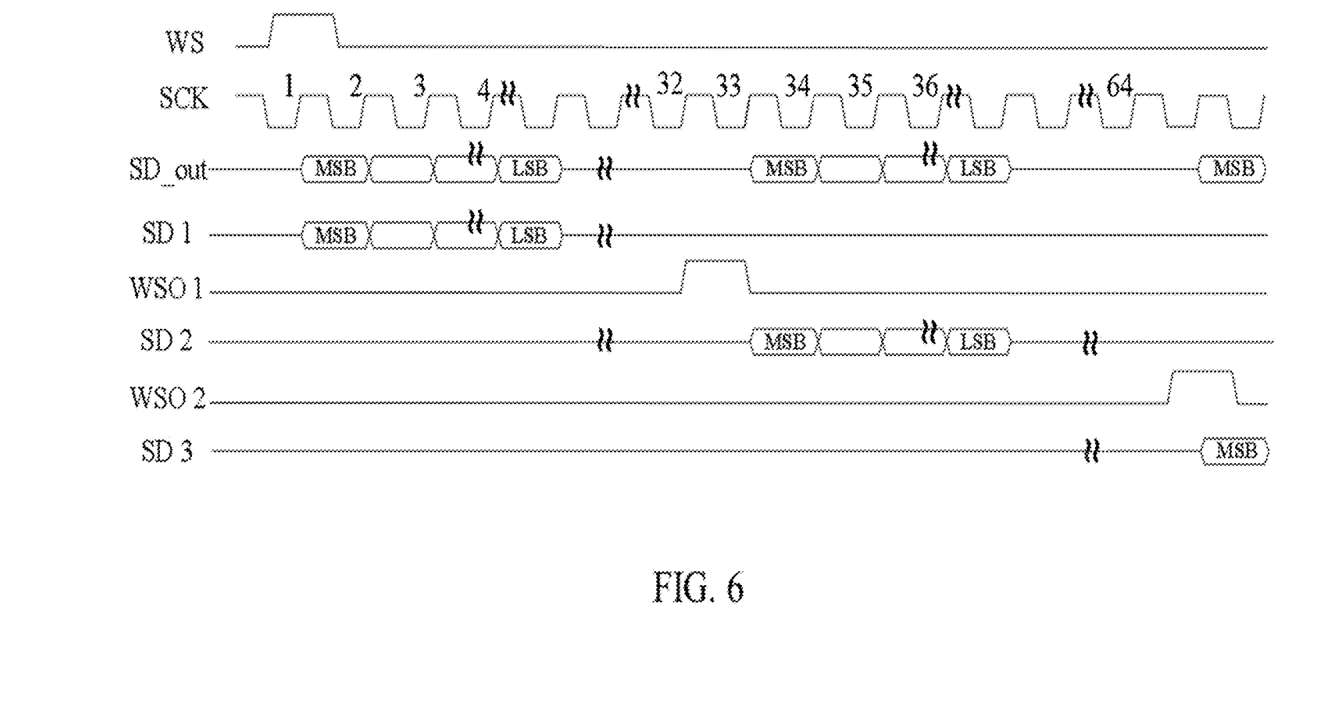
FIG. 6 shows a signal time sequence diagram of the TDM transmission circuit shown in FIG. 5.

FIG. 6 is a signal timing diagram of the TDM transmission circuit in FIG. 5. The processing unit 20 outputs the word select signal WS and the clock signal SCK, the SD pin of the TDM audio chip 52 outputs audio data SD1, and the WSO pin of the TDM audio chip 52 transmits the word select output signal WSO1 to the WS pin of the TDM audio chip 54, the SD pin of the TDM audio chip 54 outputs audio data SD2, and the WSO pin of the TDM audio chip 54 transmits the word select output signal WSO2 to the WS pin of the TDM audio chip 58, and the SD pin of the TDM audio chip 54 output audio data SD3. Therefore, the signal received by the audio data interface 106 of the processing unit 20 is an audio data SD out.

Figure 7:
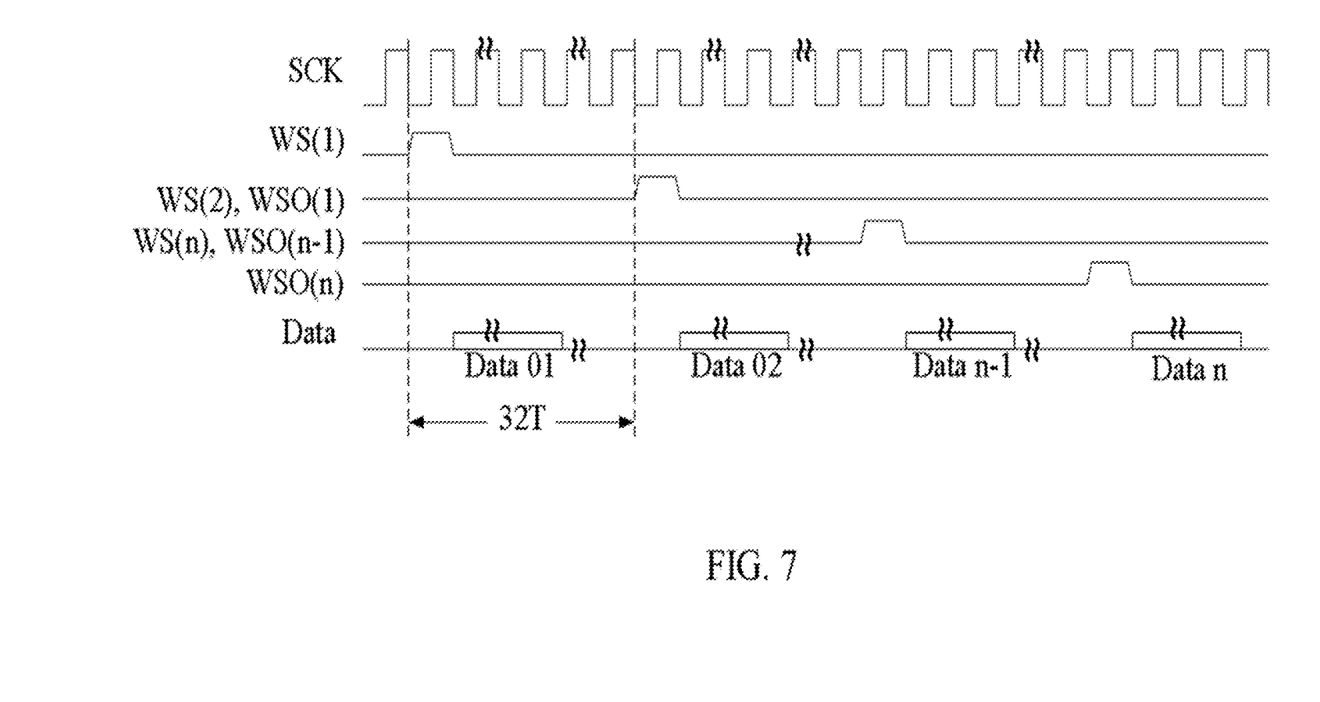
FIG. 7 shows the signal time sequence diagram of the TDM transmission circuit with multiple TDM audio chips.

FIG. 7 shows the signal time sequence diagram of the TDM transmission circuit with multiple TDM audio chips. Among them, when n=1 or 2, the clock cycle is 64. If n=1, WS(2) will not generate the high electrical potential, so Data 02 has no signal output. When n=3 or n=4, the clock cycle is 128. If n=3, WS(4) will not generate the high electrical potential, so Data 04 has no signal output. When n=5-8, the clock cycle is 256. When n≠8, WS(n+1) will not generate the high electrical potential, so Data (n+1) has no signal output. And so on, when n is between 9 and 16, the clock cycle is 512. During the remaining clock period, WS(n+1) will not generate the high electrical potential, so Data (n+1) no signal output. Therefore, the signal time sequence diagram of the TDM transmission circuit shown in FIG. 7 is only a range. Anyone with knowledge in the field can use the TDM transmission principle to form a TDM transmission circuit with different numbers of TDM audio chips are within the scope of the present disclosure.

Figure 8:
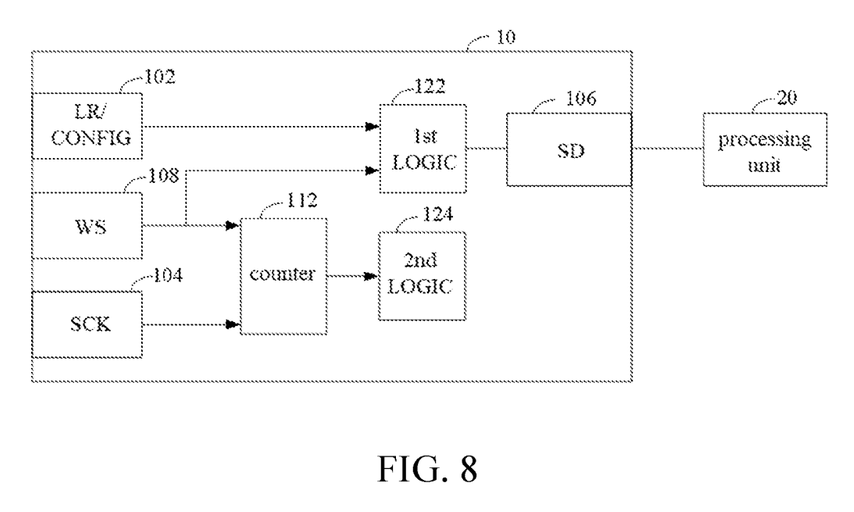
FIG. 8 shows a schematic diagram of the audio data processing circuit of the present disclosure.

FIG. 8 shows a schematic diagram of the audio data processing circuit of the present disclosure. The audio data processing circuit 10 of the present disclosure includes a counter 112, a first logic unit 122, and a second logic unit 124. The audio data processing circuit 10 receive the audio data by the selection interface 102, the clock signal interface 104, and the word select interface 108, and the audio data processing circuit 10 transmits the audio data to the processing unit 20 through the audio data interface 106. The feature of the present disclosure is that the processing unit 20 can configure the audio data processing circuit 10 as an I2S transmission interface or a TDM transmission interface according to requirements, and the audio data processing circuit 10 decoding the received audio data and transmitting it to the processing unit 20.

In the audio data processing circuit 10 of the present disclosure, the counter 112 is configured to calculate the number of clocks of the clock signal SCK transmitted by the clock signal interface 104 in the period of a word select signal transmitted by the word select interface 108 (i.e. the WS signal in FIGS. 4 and 6 complete a high electrical potential and a low electrical potential cycle period). The first logic unit 122 is configured to generate the audio data interface signal SD according to the word select signal WS and the channel selection signal LR. The second logic unit 124 is configured to determine the number of channels of the audio data according to the word select signal WS and the clock signal SCK. Specifically, the second logic unit 124 calculates the number of the clock signal SCK between two adjacent rising edges of the selection signal WS, determines the number of channels of audio data transmitted by the I2S transmission interface, and divides the clock signal SCK according to the number of channels of audio data and sends it to an analog front end (AFE) as a sample clock. When the processing unit 20 setting the audio data processing circuit 10 as the I2S transmission interface, as shown in FIG. 4, if the channel selection signal LR is at the low electrical potential (LR=0), in the beginning of the next clock signal SCK after the falling edge of the word select signal WS, sending 32-bit audio data to the processing unit 20. If the channel selection signal LR is at high electrical potential (LR=1), in the beginning of the next clock signal SCK after the rising edge of the word select signal WS, sending 32-bit audio data to the processing unit 20. When the processing unit 20 sets the audio data processing circuit 10 as the TDM transmission interface, as shown in FIG. 6, starting from the next clock signal SCK after the rising edge of the word select signal WS, the 32-bit audio data is sent to the processing unit 20, after the word select signal WS outputs a pulse and the clock signal SCK outputs 32 clocks, the word select output signal WSO outputs a pulse (WSO=1) to the word select interface 108 of the next channel.

The feature of the audio data processing circuit of the present disclosure is that the processing unit 20 presets the bit depth of the audio data as 32 bits, because the counter 112 counts the number of clocks of the clock signal. The second logic unit 124 determines the number of channels according to the number of clocks of the clock signal. When the number of clocks of the clock signal is 64, the number of channels is 1 to 2. When the number of clocks of the clock signal is 128, the number of channels is 3 to 4. When the number of clocks of the clock signal is 256, the number of channels is 5 to 8. When the number of clocks of the clock signal is 512, the number of channels is 9 to 16. Since only TDM audio chips can connect more than 3 audio chips in series, when the number of channels exceeds 2, it means that the audio data is transmitted by the TDM transmission interface. When the number of channels is 2, the audio data may be transmitted by the I2S transmission interface or the TDM transmission interface. However, for the audio processing module of the prior art, it is only necessary to switch the polarity of the channel selection interface 102, and the audio data processing circuit 10 can process the audio data transmitted through the I2S transmission interface and TDM transmission interface. In detail, when the processing unit 20 processes the audio data by the audio data processing circuit 10 through the I2S transmission interface, the channel selection interfaces 102 in the two audio data processing circuits 10 are respectively connected to a high electrical potential (LR=1) and low electrical potential (LR=0). When the processing unit 20 processes the audio data processed by the audio data processing circuit 10 through the TDM transmission interface, the channel selection interfaces 102 in all the audio data processing circuits 10 are connected to the high electrical potential (LR=1 or CONFIG=1). In the preferred embodiment of the present disclosure, regardless of whether the audio data processing circuit 10 processes the audio data transmitted through the I2S transmission interface or the TDM transmission interface, the channel selection interface 102 is essentially the same pin, when the audio data processing circuit 10 processes the audio data transmitted through the I2S transmission interface, the channel selection interface is regarded as the LR pin of the I2S audio chip. when the audio data processing circuit 10 processes the audio data transmitted through the TDM transmission interface, the channel selection interface is regarded as the CONFIG pin of the TDM audio chip. A pulse interval between the word select signal of the audio data circuit of current level and the word select signal of the next level of audio data circuit (such as the first-level word select signal WS and the second-level word select signal WS(2)) is 32T (i.e. 32 clocks of the clock signal SCK).

Figure 9:
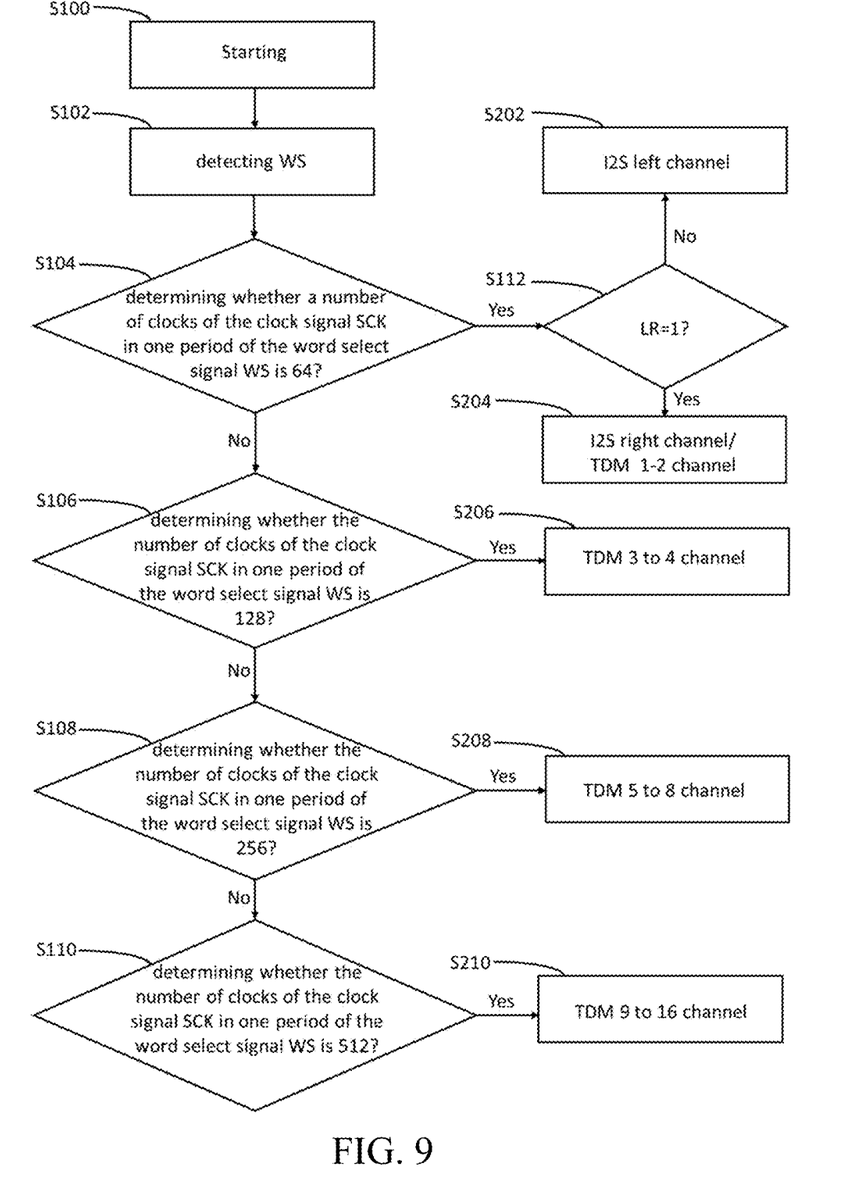
FIG. 9 shows a flowchart of the audio data processing method of the present disclosure.

FIG. 9 shows a flowchart of the audio data processing method of the present disclosure. Step S100, starting the audio protocol detection when the audio data processing circuit 10 receives the audio data. Step S102, detecting a period of the word select signal WS, that is, detecting a number of clocks of the clock signal SCK in one period of the word select signal WS. Step S104, determining whether the number of clocks of the clock signal SCK in one period of the word select signal WS is 64. That is, whether the number of clocks of the clock signal SCK in the time required for the word select signal WS to complete the high electrical potential and the low electrical potential cycle is 64? If yes, execute step S112, if not, execute step S106. It is worth noting that the period of the word select signal WS refers to the number of clocks of the clock signal SCK during the period from this rising edge to the next rising edge of the word select unit of the same audio data circuit, that is, the number of clocks of the clock signal SCK between two pulses.

Step S112: determining whether the electrical potential of the channel selection interface 102 is logic 1 (i.e., high potential). When the channel selection interface 102 is at the high electrical potential (LR=1), it means that the audio data is the right channel of the I2S audio transmission interface or transmitted by 1 to 2 TDM audio chips. When the channel selection interface 102 is at the low electrical potential (LR=0), it means that the audio data is the left channel of the I2S audio transmission interface.

Step S106: detecting whether the number of clocks of the clock signal SCK in one period of the word select signal WS is 128, that is, detecting the number of clocks of the clock signal SCK in the time required for the word select signal WS to complete the cycle of high electrical potential and the low electrical potential is 128? If yes, it means that the audio data is transmitted through 3 to 4 TDM audio chips, so performing step S206 to process 3-4 channels of TDM audio data. If not, performing step S108.

Step S108 detecting whether the number of clocks of the clock signal SCK in one period of the word select signal WS is 256, that is, detecting the number of clocks of the clock signal SCK in the time required for the word select signal WS to complete the cycle of the high electrical potential and the low electrical potential is 64? If yes, it means that the audio data is transmitted through 5 to 8 TDM audio chips, then performing step S208 to process 5-8 channels of TDM audio data. If not, performing step S110.

Step S110, detecting whether the number of clocks of the clock signal SCK in one period of the word select signal WS is 512, that is, the number of clocks of the clock signal SCK in the time required for the word select signal WS to complete the cycle of the high electrical potential and the low electrical potential is 64? If yes, it means that the audio data is transmitted through 9 to 16 TDM audio chips, so performing step S210 to process 9 to 16 channels of TDM audio data.

By the audio data processing circuit and audio data processing method of the present disclosure, no additional pins and settings are required. Simply change the polarity of the channel selection interface to make the audio data processing circuit and audio data processing method of the present disclosure can process the audio data of the I2S audio transmission interface and the TDM audio transmission interface, so as to reduce the circuit production cost required by the audio data processing circuit, and at the same time improve the efficiency of the audio data processing method.

Although the present disclosure has been disclosed in preferred embodiments, it is not intended to limit the present disclosure. Anyone who is familiar with the art can make various changes and modifications without departing from the spirit and scope of the present disclosure. Therefore, the protection scope of the present disclosure shall be subject to those defined by the scope of the attached claims.

What is claimed is:

1. An audio data processing circuit configured to transmit audio data to a processing unit, comprising:
    a word select interface configured to receive a word select signal of the processing unit;
    a clock signal interface configured to receive a clock signal of the processing unit;
    an audio data interface configured to transmit the audio data to the processing unit through a first transmission protocol or a second transmission protocol;
    a first logic unit configured to generate an audio data interface signal according to the word select signal and a channel selection signal; and
    a second logic unit configured to calculate a number of clocks of the clock signal in one period of the word select signal;
    wherein the audio data processing circuit determines to transmit the audio data through the first transmission protocol or the second transmission protocol according to the audio data interface signal and the number of clocks of the clock signal.

2. The audio data processing circuit as claimed in claim 1, comprising:
    a counter configured to count the number of clocks of the clock signal.

3. The audio data processing circuit as claimed in claim 1, wherein a bit depth of the audio data is 32 bits.

4. The audio data processing circuit as claimed in claim 1, wherein the first transmission protocol is an inter-IC sound protocol, and the second transmission protocol is a time division multiplexing protocol.

5. The audio data processing circuit as claimed in claim 4, wherein when the number of clocks of the clock signal in one period of the word select signal is more than 64, the audio data is transmitted to the processing unit through the second transmission protocol.

6. An audio data processing method for transmitting an audio data to a processing unit, comprising:
    step 1: detecting a word select signal of the processing unit;
    step 2: determining whether a number of clocks of a clock signal in one period of the word select signal is 64 and going to step 3 if the number of clocks of the clock signal in one period of the word select signal is 64, else going to step 4;
    step 3: sending the audio data to the processing unit through a first transmission protocol; and
    step 4: sending the audio data to the processing unit through a second transmission protocol;
    wherein the step 2 further comprises generating an audio data interface signal according to a channel selection signal and the word select signal by a first logic unit of the processing unit and transmitting the audio data to the processing unit through the first transmission protocol or the second transmission protocol according to the audio data interface signal, and determining a number of channels of the audio data according to the period of the word select signal by a second logic unit of the processing unit;
    wherein the audio data processing circuit determines to transmit the audio data through the first transmission protocol or the second transmission protocol according to the audio data interface signal and the number of clocks of the clock signal.

7. The audio data processing method as claimed in claim 6, wherein a bit depth of the audio data is 32 bits.

8. The audio data processing method as claimed in claim 6, wherein the step 2 further comprises calculating the number of clocks of the clock signal in one period of the word select signal by a counter of the processing unit, and determining whether the number of clocks of the clock signal in one period of the word select signal is 64.

* * * * *